(No Model.)
G. P. FENNER.
JOURNAL BEARING.
No. 265,047. Patented Sept. 26, 1882.
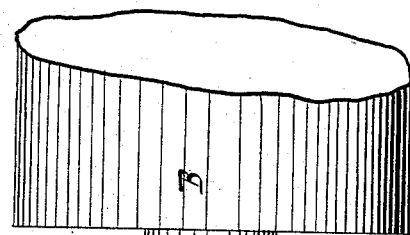
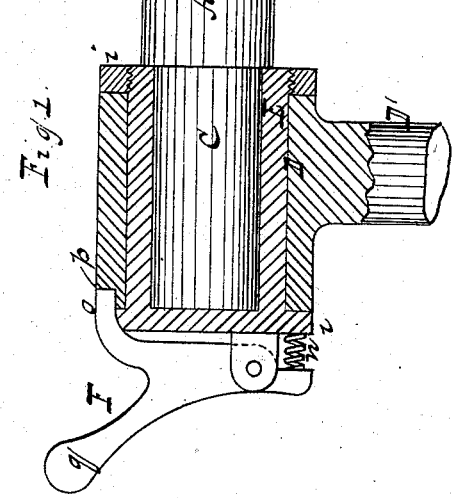
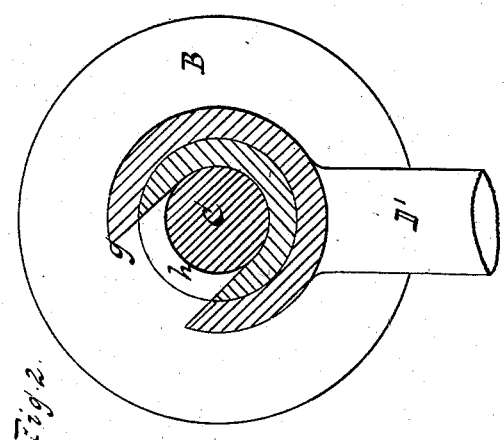
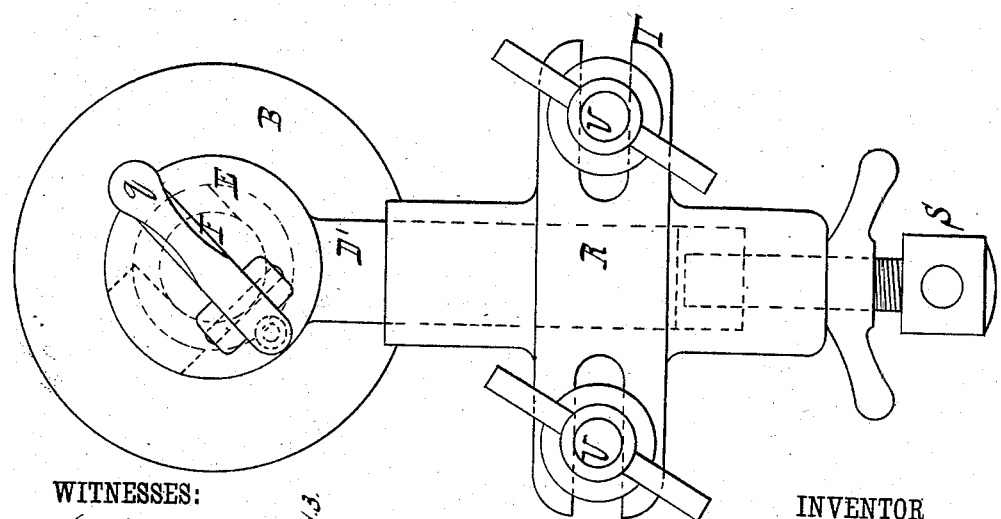
WITNESSES:
William Miller
Otto Hufeland
INVENTOR
George P Fenner
BY Van Santvoord & Hauff
ATTORNEYS

UNITED STATES PATENT OFFICE.

GEORGE P. FENNER, OF NEW LONDON, CONNECTICUT.

JOURNAL-BEARING.

SPECIFICATION forming part of Letters Patent No. 265,047, dated September 26, 1882.

Application filed August 19, 1882. (No model.)

*To all whom it may concern:*

Be it known that I, GEORGE P. FENNER, a citizen of the United States, residing at New London, in the county of New London and State of Connecticut, have invented new and useful Improvements in Journal-Bearings, of which the following is a specification.

This invention relates to journal-bearings for the roller-shafts of printing-presses or other machinery, and especially inking-roller shafts, its object being to produce a bearing which is adapted to be readily laid open for the removal or introduction of the journal, and to be closed when the journal has been put in place; and it consists in the means hereinafter described for effecting such object.

This invention is illustrated in the accompanying drawings, in which Figure 1 represents a longitudinal section. Fig. 2 is a cross-section. Fig. 3 is an end view.

Similar letters indicate corresponding parts.

The letter A designates one end of a shaft, carrying a roller, B, and having its journal C provided with a bearing in accordance with my invention. This bearing consists of a hub, D, fixed to the upper end of a standard, D', a bushing, E, fitted into the hub to rotate therein, and a locking-latch, F, to the bushing, both the hub and bushing being of segmental shape, and their spaces or openings $g\ h$ being equal in width, respectively, to the diameter of the journal. The segmental bushing E is provided at the opposite ends with outwardly-projecting flanges or stops $i\ i''$, which hug the ends of the hub D, thus holding the bushing against longitudinal displacement, and the latch F is a fixture of the bushing, it being hung thereto by a pivot, $k$. This latch, moreover, is subjected to the action of a spring, $n$, having a tendency to throw its bit or locking end $o$ into engagement with a notch, $p$, in the hub, and it is shaped to form a handle, $q$, which serves not only to adjust the latch, but also to turn the bushing. The outer end of the bushing E is preferably closed to afford a substantial support to the latch F, as well as to exclude dust or grit from the journal at that place.

When it is desired either to remove or place the journal C in the bearing the bushing E is turned until its opening $h$ registers with the opening $g$ of the hub, as shown in Fig. 2, the two openings thus presenting a clear passage to the journal, while when the journal has been put into place the bushing is turned to bring the openings $g\ h$ out of registration with each other, thereby effectually closing the bearing. The notch $p$ is formed at such a point in the hub that the bit $o$ of the latch enters the notch when the bushing is set to close the bearing, as last stated, and hence the bushing is not liable to be turned by accident. If desired, a secondary notch may be used to receive the latch and lock the bushing in an opened position. The standard D' is combined with a socket, R, in which it can be adjusted vertically by a set-screw, S, and which has lateral projections T, slotted for their adjustment in that direction by set-screws U, passing through the slots.

What I claim as new, and desire to secure by Letters Patent, is—

1. The combination, substantially as hereinbefore described, of the segmental fixed hub D and the segmental rotating bushing E.

2. The combination, substantially as hereinbefore described, of the segmental fixed hub D, the segmental rotating bushing E, and the stops $i\ i$, formed at the opposite end of said bushing.

3. The combination, substantially as hereinbefore described, of the segmental fixed hub D, the segmental rotating bushing E, flanged at the opposite ends, the latch pivoted to the bushing and adapted to engage with a notch in the hub, and the spring $n$, acting on the latch.

In testimony whereof I have hereunto set my hand and seal in the presence of two subscribing witnesses.

GEORGE P. FENNER. [L. S.]

Witnesses:
W. HAUFF,
E. F. KASTENHUBER.